United States Patent
Chen

(10) Patent No.: US 12,498,589 B2
(45) Date of Patent: Dec. 16, 2025

(54) ASPHERICAL LENS DESIGN WITH POWER DEPENDENT SPHERICAL ABERRATION

(71) Applicant: Johnson & Johnson Vision Care, Inc., Jacksonville, FL (US)

(72) Inventor: Minghan Chen, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 815 days.

(21) Appl. No.: 17/476,528

(22) Filed: Sep. 16, 2021

(65) Prior Publication Data

US 2023/0085523 A1  Mar. 16, 2023

(51) Int. Cl.
*G02C 7/04* (2006.01)

(52) U.S. Cl.
CPC ........... *G02C 7/04* (2013.01); *G02C 2202/20* (2013.01)

(58) Field of Classification Search
CPC ...... G02C 7/04; G02C 2202/20; G02C 7/024; G02C 2202/22; G02C 7/044
See application file for complete search history.

(56) References Cited

U.S. PATENT DOCUMENTS

| | | | |
|---|---|---|---|
| 9,733,494 B2 * | 8/2017 | Brennan | A61F 2/16 |
| 11,112,621 B2 | 9/2021 | Chen | |
| 2010/0057202 A1 * | 3/2010 | Bogaert | A61F 2/1613 |
| | | | 623/6.27 |
| 2013/0222766 A1 * | 8/2013 | Legerton | G02C 7/04 |
| | | | 351/219 |
| 2018/0313717 A1 * | 11/2018 | Wang | G01M 11/0235 |
| 2019/0064543 A1 | 2/2019 | Wooley et al. | |

FOREIGN PATENT DOCUMENTS

| | | |
|---|---|---|
| WO | 2006053776 A1 | 5/2006 |
| WO | 2009131905 A1 | 10/2009 |
| WO | 2019138089 A1 | 7/2019 |

OTHER PUBLICATIONS

International Search Report and Written Opinion received for PCT Application No. PCT/IB2022/058434, 12 pages, mailed on Dec. 15, 2022.
Kho, et al.,"Effects of relative negative spherical aberration in single vision contact lens visual performance", Clinical Optometry, vol. 10, 13 pages, 2018.
Extended European Search Report received for European Application No. 22869497.2, mailed on Jun. 26, 2025, 9 pages.
Wagner et al., "Power Profiles of Single Vision and Multifocal Soft Contact Lenses", Contact Lens and Anterior Eye, vol. 38, No. 1, pp. 2-14, Feb. 2015.

* cited by examiner

*Primary Examiner* — Pinping Sun
*Assistant Examiner* — Gabriel A Sanz

(57) ABSTRACT

Described herein are soft contact lens sets and methods of designing soft contact lens sets based on incorporating different levels of spherical aberration into the lens design depending on the target spherical power. The different levels of spherical aberration are equal to or less than zero $D/mm^2$, and account for clinically measured population-average ocular spherical aberration, manufacturing variations and generalized accommodative ability.

6 Claims, 4 Drawing Sheets

ASPHERICAL LENS DESIGN WITH POWER DEPENDENT SPHERICAL ABERRATION

FIELD OF USE

The present invention relates to soft contact lens sets and methods of designing soft contact lens sets with improved vision by incorporating spherical aberration in a manner that accounts for variations amongst the wearing population, lens manufacturing, and accommodative ability.

BACKGROUND OF THE INVENTION

Myopia or nearsightedness is a refractive defect of the eye in which light rays from an object are focused in front of the retina. Myopia occurs because the eyeball elongates along the optical axis or the contour of the corneal is too steep. A minus powered spherical lens may be utilized to correct myopia. Hyperopia or farsightedness is a refractive defect of the eye in which light rays from an object are focused behind the retina. Hyperopia occurs because the eyeball shortens along the optical axis or the contour of the cornea is too flat. A plus powered spherical lens may be utilized to correct hyperopia. The spherical surfaces of both minus and plus powered spherical lenses are imperfect at refocusing the light rays from an object into an image. One aberration is known as spherical aberration ("SPHA"). Spherical aberration reduces the quality of the image because light rays from the object refracted from different radial locations of the lens refocus at different locations or foci along the optical axis, resulting in a blurred image. Astigmatism occurs when the cornea is not rotationally symmetric or when the crystalline lens is misaligned, resulting into two orthogonal image focal points. Astigmatism is usually caused by a non-rotationally symmetric corneal surface requiring either a minus powered or plus powered lenses to be oriented on eye to correct for myopia or hyperopia. Orientation requires a means for lens rotational stability around a fixed axis on eye, typically achieved by thickness profiles located on the anterior surface of the lens periphery. Lenses correcting for astigmatism are commonly referred to as toric lenses. Multifocal lenses on the other hand are used to treat presbyopia and may also be toric lenses.

Like other curved refractive surfaces, the ocular system (including cornea, crystal lens, etc.) exhibits some SPHA. As a result, when myopia, hyperopia, astigmatism, or presbyopia is corrected using soft contact lenses, the SPHAs of the soft contact lens and the cornea may combine in uncontrolled ways and may thereby diminish the visual acuity of the contact lens wearer. Accordingly, it would be advantageous to design soft contact lenses in a systematic way that considers many factors that either cause or affect SPHA, resulting in a set of contact lenses having improved visual acuity across a range of spherical powers.

SUMMARY OF THE INVENTION

Described herein are soft contact lenses and lens sets and methods of designing soft contact lenses and lens sets based on incorporating different levels of spherical aberration into the lens design depending on the target spherical power. The different levels of spherical aberration are chosen by compensating for a population-average ocular spherical aberration profile and a spherical comparator lens spherical aberration profile. The inventive method provides an efficient means to address spherical aberration errors by limiting the number of different levels of incorporated spherical aberration across a spherical power range. The inventive soft contact lenses and lens sets provide improved visual acuity over spherical comparator lenses having the same base curve radii.

According to one embodiment, a set of contact lenses is provided wherein each contact lens in the set has a first surface adapted to be placed against a user's eye and a second opposing surface, wherein the first and second surfaces meet at a lens edge defining a periphery of the lens. Each lens has an optical power profile and a SPHA profile such that for positive optical lens powers, the SPHA profile is less than or equal to zero (0) $D/mm^2$ and greater than or equal to $-0.055$ $D/mm^2$; for negative optical lens powers between about $-3D$ and $0D$, the SPHA profile is less than or equal to $0.0167*SP$ $D/mm^2$ and greater than or equal to $-0.055$ $D/mm^2$; for negative optical lens powers between $-3.5D$ and about $-3D$, the SPHA profile is less than or equal to $0.0167*SP$ $D/mm^2$ and greater than or equal to $0.0356*SP+0.0467$ $D/mm^2$; and for negative optical lens powers between $-8D$ and $-3.5D$, the SPHA profile is less than or equal to $0.0082*SP-0.0301$ $D/mm^2$ and greater than or equal to $0.0356*SP+0.0467$ $D/mm^2$. "SP" denotes spherical power in these mathematical formulae, and SP is expressed in diopters.

In another embodiment, for negative optical powers between $-8D$ and $-3.5D$ the SPHA profile is less than or equal to $0.0082*SP-0.0301$ $D/mm^2$ and greater than $0.0167*SP$ $D/mm^2$, and in yet another embodiment, for negative optical powers between $-8D$ and about $-3D$ the SPHA profile is less than $0.0167*SP$ $D/mm^2$ and greater than or equal to $0.0356*SP+0.0467$ $D/mm^2$.

The first and second surfaces may be selected from the group consisting of aspheric, spherical, and mixtures thereof, may be toric lenses, and/or may be multifocal lenses.

The set of contact lenses may provide improved visual acuity as compared to a spherical comparator set of contact lenses.

Also provided is a set of contact lenses, wherein each contact lens in the set has a first surface adapted to be placed against a user's eye and a second opposing surface, wherein the first and second surfaces meet at a lens edge defining a periphery of the lens. The lenses have an optical power and a SPHA profile such that for positive optical lens powers, the SPHA profile is equal to 0 $D/mm^2$; for negative optical lens powers between about $-3.5D$ and $0D$, the SPHA profile is equal to $0.0167*SP$ $D/mm^2$; and for negative optical lens powers between $-8D$ and $-3.5D$, the SPHA profile is $0.0082*SP-0.0301$ $D/mm^2$.

The first and second surfaces may be selected from the group consisting of aspheric, spherical, and mixtures thereof, the set may include toric lenses, and/or the set may include multifocal lenses. Further, the set may provide improved visual acuity as compared to a spherical comparator set of contact lenses.

In yet another embodiment, a set of contact lenses are provided where each contact lens in the set has a first surface adapted to be placed against a user's eye and a second opposing surface, wherein the first and second surfaces meet at a lens edge defining a periphery of the lens. Each lens has an optical power profile and a SPHA profile such that for negative optical powers between about $-3D$ and $0D$ and all positive optical powers, the SPHA profile is equal to $-0.055$ $D/mm^2$; and for negative optical lens powers between about $-8D$ and about $-3D$, the SPHA profile is equal to $0.0356*SP+0.0467$ $D/mm^2$.

The first and second surfaces may be selected from the group consisting of aspheric, spherical, and mixtures thereof, the lenses may be toric lenses, and/or the lenses may be multifocal lenses.

The set of contact lenses may provide improved visual acuity as compared to a spherical comparator set of contact lenses.

Also provided are a set of contact lenses, where each contact lens in the set has a first surface adapted to be placed against a user's eye and a second opposing surface, wherein the first and second surfaces meet at a lens edge defining a periphery of the lens. Each lens has an optical power and a SPHA profile such that for negative optical powers between −2.9D and 0D and all positive optical powers, the SPHA profile is equal to −0.055 D/mm$^2$; and for negative optical lens powers between about −8D and −2.9D, the SPHA profile is equal to 0.0356*SP+0.0467 D/mm$^2$.

The first and second surfaces may be selected from the group consisting of aspheric, spherical, and mixtures thereof, the lenses may be toric lenses and/or the lenses may be multifocal lenses.

The set of contact lenses may provide improved visual acuity as compared to a spherical comparator set of contact lenses.

A method for making a set of contact lenses is also provided including the steps of measuring a population-average ocular spherical aberration profile, comparing the population-average ocular spherical aberration profile with a spherical comparator lens spherical aberration profile, creating a spherical aberration profile that compensates for the population-average ocular spherical aberration profile in relation to a spherical comparator lens spherical aberration profile as well as the level of user accommodation as a function of spherical power and manufacturing precision, and forming a set of soft contact lenses exhibiting the spherical aberration profile across a range of spherical power.

The spherical aberration profile may be equal to or less than zero (0) D/mm$^2$ across the spherical power range. The spherical aberration profile may be described by two or more linear equations across the spherical power range. The set of lenses may consist of aspherical lenses, toric lenses, multifocal lenses, and combinations thereof.

BRIEF DESCRIPTION OF THE DRAWINGS

The following drawings show generally, by way of example, but not by way of limitation, various examples discussed in the present disclosure. In the drawings.

DETAILED DESCRIPTION

Figure 1:
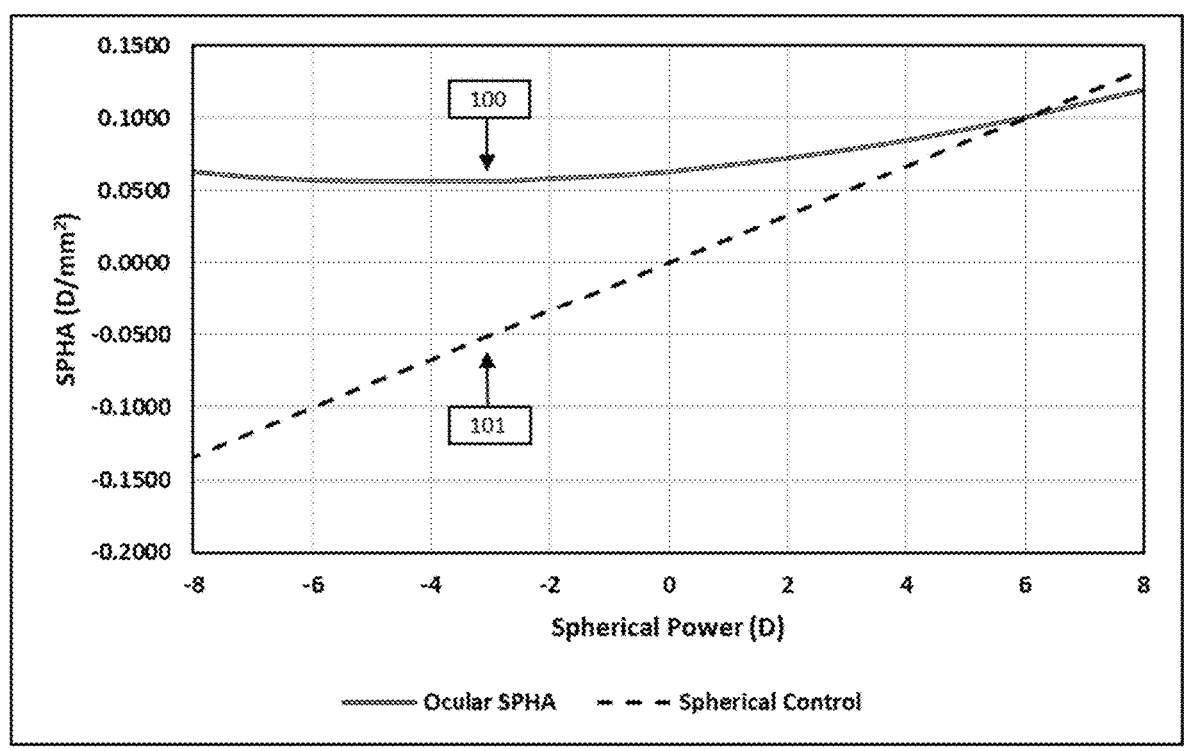
FIG. 1 shows how a population-average ocular SPHA profile (line 100) varies as a function of power in comparison to a spherical comparator lens SPHA profile (line 101).

As noted, the present invention provides an improved soft contact lens design, a method for designing such a lens, and a lens set that achieves improved vision by minimizing image blurring caused by SPHA. The design considers the ocular SPHA across a patient population as described below, as well as the effects on SPHA from manufacturing fluctuations and the accommodative abilities of patients with varying refractive errors.

A population-average ocular SPHA profile was created by plotting the average computed ocular SPHA as a function of spherical power ($P_0$). The computed ocular SPHA was determined from the clinically measured wavefronts from about 3,500 subjects. The wavefronts were obtained using a wavefront senor or aberrometer such as the instruments available from Visionix, Luneau Technology Inc. The ocular power profile P(r) is defined as $P(r)=(1/r)\partial w/\partial r$, where w is the measured wavefront and r is the lens radius. The ocular power profiles P(r) were fitted with even polynomial: $P(r) = P_0 + SA_4 r^2 + SA_6 r^4 + SA_8 r^6 + \ldots$ . The second order coefficient ($SA_4$) is the ocular SPHA and has the units of D/mm$^2$ where D=diopters and mm=millimeters. Following the above methodology, the ocular SPHA was computed for every subject and then averaged to generate the average computed ocular SPHA as shown by line 100 in FIG. 1. Also shown in FIG. 1 as line 101 is the computed comparator lens spherical aberration profile for a lens having a base curve radius of 8.5 mm. Other comparator lenses can be used having different base curve radii. Not all comparator lenses exhibit linear or near linear SPHA profiles. In any case, for a given base curve radius, comparator lenses with negative spherical powers exhibit negative SPHA, and comparator lenses with positive spherical powers exhibit positive SPHA. Only plano lenses exhibit zero SPHA regardless of spherical power.

Lens Design Rationale

The inventive lens set incorporates several specific design principles and clinical observations. First, referring to FIG. 2, the inventive lens design incorporates finite levels of zero or negative SPHA within specifically targeted sphere power ranges in a manner that accounts for ocular, SPHA, manufacturing variations, and accommodative ability, rather than targeting to simply cancel out ocular SPHA, resulting in a net zero SPHA for all spherical powers. Designing for net zero SPHA in this way ignores two other inter-related factors that affect SPHA and overall vision, namely variations in SPHA due to lens manufacturing and variations in the amount of accommodation available to the contact lens wearer. Typical manufacturing SPHA variations depend on spherical power and can be calibrated in the range of −0.02 D/mm$^2$ to +0.02 D/mm$^2$. Negative SPHA variations from manufacturing impact visual acuity less dramatically than positive SPHA variations because negative SPHA can be compensated for at least partially by accommodation of the contact lens wearer. Thus, SPHA has a larger tolerance for SPHA toward the negative side shift than that of a positive shift. In general, manufacturing tolerance within −0.1 to about +0.03 D/mm$^2$ [with 3, 4 and 5 mm pupil size] will be good enough to satisfy SPHA precision requirement. Since myopes and hyperopes generally have different accommodation abilities, another operative design feature is to segment the SHPA profile into two to five segments over the spherical power range. In this way, the amount of incorporated SPHA in the lens design can be tailored to the level of accommodation of the contact lens wearer across a range of refractive error. The preferred number of segments is two or three segments.

The inventive lens design is best suited for optimizing distance vision for eyes without an appreciable accommodation lag. However, as eyes age but before the onset of presbyopia, a small or moderate accommodation lag can develop and significantly affect near vision. In this case, the inventive lens design incorporates more negative SPHA into high minus powers than that exhibited by the spherical comparator lenses and smaller amounts of negative SPHA into the lower minus and plus powers. The exact values are determined in part by acknowledging that minus 3D lenses typically provide the best subjective vision. The minus 3D comparator spherical lens shown in FIG. 1 exhibited a SPHA of approximately minus 0.05 D/mm$^2$.

In summary, the inventive lens design prescribes an SPHA value calculated from a SPHA profile. The SPHA profile is defined as a continuous segmented function, each segment in the function associates a SPHA value (D/mm$^2$) to the inventive lens design depending on its spherical power (D). The SPHA values are equal to or less than zero (0) D/mm$^2$ which compensate for clinically measured ocular SPHA, manufacturing errors, and accommodative ability.

Referring back to the figures, as noted previously FIG. 1 shows how a population SPHA profile (line 100) varies as a function of power in comparison to a spherical comparator lens SPHA profile (101) for a lens having a base curvature of ~8.5 mm and material with a refractive index ~1.42. The SPHA profile of the spherical control lens is computed and is substantially linear defined by the equation Y=0.0167*SP, which is negative for negative powers and positive for positive powers. "SP" refers to sphere power and is in diopters (D). The population SPHA profile, derived from population data as described above, is slightly positive for all sphere powers.

Figure 2:
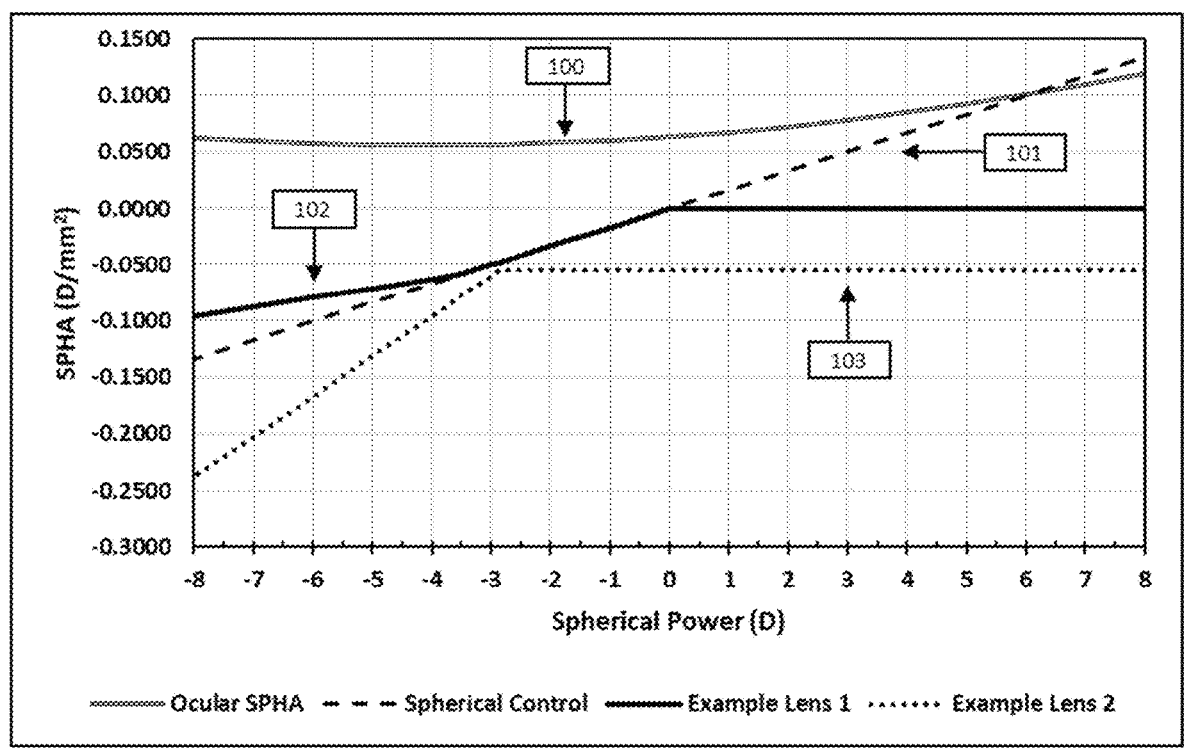
FIG. 2 shows the SPHA profiles of the inventive lens design Example Lens 1 (line 102) and Example Lens 2 (line 103) in comparison to the population-average ocular SPHA profile (line 100) and the spherical comparator lens SPHA profile (line 101).
Figure 3:
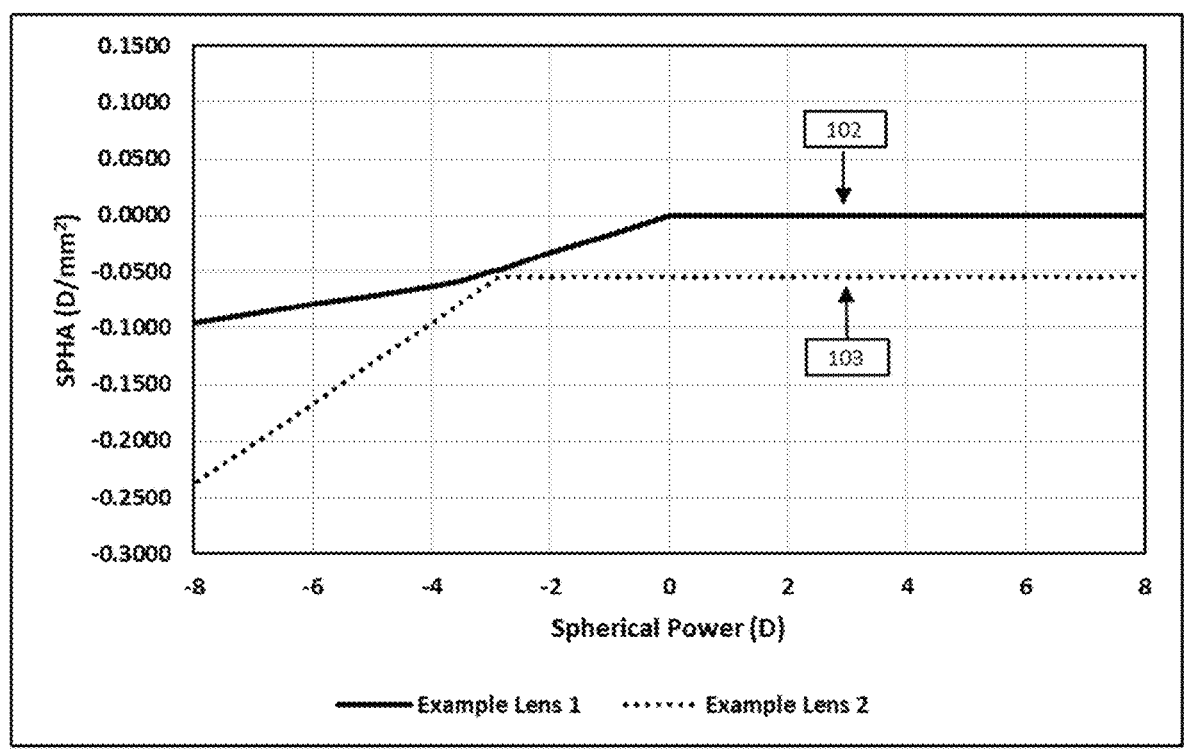
FIG. 3 shows only the SPHA profiles of the inventive lens design Example Lens 1 (line 102) and Example Lens 2 (line 103).

FIG. 2 illustrates the SPHA profiles of FIG. 1, but also SPHA profiles of two exemplary lens set embodiments of the present invention. For the first embodiment noted as Example Lens 1 illustrated by line 102, for positive spherical powers the SPHA profile is approximately zero. For negative spherical powers between about −3.5D and −3.0D, the SPHA profile is defined by 0.0356*SP+0.0467 D/mm$^2$, and for negative spherical powers greater than −3.5D, the SPHA profile is defined by 0.0082*SP−0.0301 D/mm$^2$. For Example Lens 2 illustrated by line 103, for negative optical powers greater than about −3.0D up to and including all positive optical powers, the SPHA profile is defined by −0.055 D/mm$^2$, whereas for all optical powers less than about −3D the SPHA profile is defined by y=0.0356*SP+ 0.0467D/mm$^2$.

Although the specific SPHA profile for Example Lens 1 and Example Lens 2 are described above in specific detail, a set of lenses with improved visual performance across and entire range of sphere powers as compared to the spherical control lens will be achieved by a SPHA profile that, for positive optical powers, falls on or between the lines depicted on FIG. 2 the two example lenses. In other words, less than or equal to Y=0 and greater than or equal to Y=−0.055 D/mm$^2$. Similarly, for optical powers between 0 and −3D, the SPHA profile is less than or equal to Y=0.0167*SP D/mm$^2$ and greater than or equal to Y=−0.055 D/mm$^2$, for optical powers between −3.5D and about −3.0D the SPHA profile is less than or equal to 0.0167*SP D/mm$^2$ and greater than or equal to 0.0356*SP+0.0467 D/mm$^2$, and for negative optical powers between −8.0D and −3.5D, the SPHA profile is less than or equal to 0.0167*SP D/mm$^2$ and greater than or equal to 0.0356*SP+0.0467 D/mm$^2$.

As noted previously, for positive powers, the presently described lens sets are designed to incorporate less SPHA than the spherical control lens, providing improved vision. For higher negative powers, SPHA is less critical as normal accommodation can counter some SPHA in a lens.

The lens sets described herein were tested across a range of lens sphere powers. Visual acuity testing was performed on 39 subjects (78 eyes), where 36 eyes had a sphere power between −4D and −7.25D, 20 eyes had a sphere power between −0.075D and −3.0D, and 22 eyes had a sphere power between 0.5D and 3.0D. The subjects were between 18 and 65 years old, and all were habitual users of disposable silicone hydrogel or silicone hydrogel soft lenses in both eyes (1-day, 2-week or monthly lenses). All subjects had a cylinder error of less than or equal to −0.75D in each eye and had a corrected visual acuity of 20/25 (Snellen or equivalent) or better in each eye.

Visual acuity was measured by asking subjects to read the smallest letters on a Snellen chart which was four meters away in both monocular and binocular conditions. Visual acuity was expressed in log MAR units according to Table 1.

TABLE 1

Snellen to LogMAR Conversion Chart

| Snellen | LogMAR |
| --- | --- |
| 20/200 | 1 |
| 20/160 | 0.9 |
| 20/125 | 0.8 |
| 20/100 | 0.7 |
| 20/80 | 0.6 |
| 20/63 | 0.5 |
| 20/50 | 0.4 |
| 20/40 | 0.3 |
| 20/32 | 0.2 |
| 20/25 | 0.1 |
| 20/20 | 0 |
| 20/16 | −0.1 |
| 20/12.5 | −0.2 |
| 20/10 | −0.3 |

Figure 4:
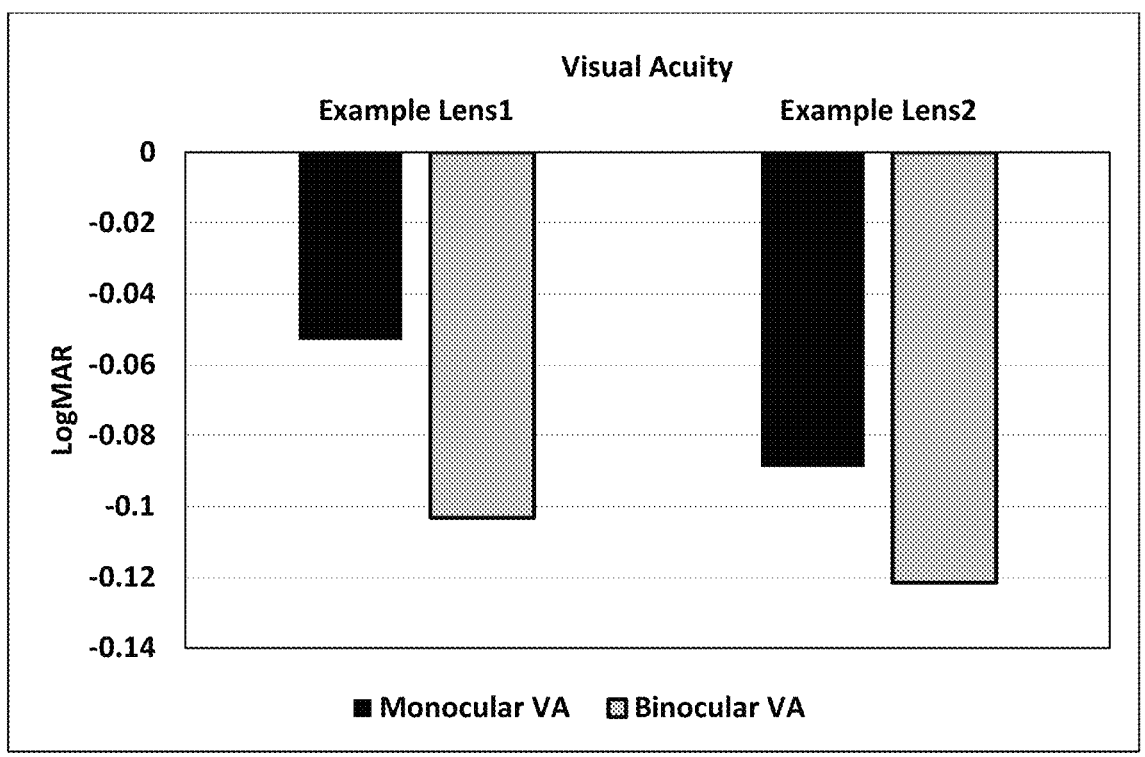
FIG. 4 shows the measured monocular and binocular visual acuity for Examples Lenses 1 and 2.

The results of the visual acuity testing were averaged together and are reflected in FIG. 4 for both monocular visual acuity and binocular visual acuity. As illustrated, visual acuity for both example Lens 1 and example Lens 2, for both monocular and binocular visual acuity, was greater than 20/20 vision (represented by zero on the Log MAR scale), indicating that the inventive lens set provides improved vision across the range of spherical powers.

What is claimed is:

1. A set of non-toric contact lenses, comprising: each contact lens in said set having a first surface adapted to be placed against a user's eye and a second opposing surface, wherein the first and second surfaces meet at a lens edge defining a periphery of said lens, an optical power profile and a spherical aberration (SPHA) profile;

wherein for positive optical lens powers, the SPHA profile is less than or equal to zero (0) D/mm2 and greater than or equal to −0.055 D/mm2;

wherein for negative optical lens powers between about −3D and 0D, the SPHA profile is less than or equal to 0.0167*SP D/mm2 and greater than or equal to −0.055 D/mm2;

wherein for negative optical lens powers between −3.5D and about −3D, the SPHA profile is less than or equal to 0.0167*SP D/mm2 and greater than or equal to 0.0356*SP+0.0467 D/mm2; and wherein for negative optical lens powers between −8D and −3.5D, the SPHA profile is less than or equal to 0.0082*SP−0.0301 D/mm2 and greater than or equal to 0.0356*SP+0.0467 D/mm2.

2. The set of non-toric contact lenses according to claim 1, wherein for negative optical powers between −8D and −3.5D the SPHA profile is less than or equal to 0.0082*SP−0.0301 D/mm2 and greater than 0.0167*SP D/mm2.

3. The set of non-toric contact lenses according to claim 1, wherein for negative optical powers between −8D and about −3D the SPHA profile is less than 0.0167*SP D/mm2 and greater than or equal to 0.0356*SP+0.0467 D/mm2.

4. The set of non-toric contact lenses according to claim 1, wherein the first and second surfaces are selected from the group consisting of aspheric, spherical, and mixtures thereof.

5. The set of non-toric contact lenses according to claim 1, wherein the set comprises multifocal lenses.

6. The set of non-toric contact lenses according to claim 1, wherein the set comprises improved visual acuity as compared to a spherical comparator set of non-toric contact lenses.

\* \* \* \* \*